United States Patent
Nicholson et al.

(10) Patent No.: US 12,307,157 B2
(45) Date of Patent: May 20, 2025

(54) SYSTEMS AND METHODS FOR CONTROLLING MICROPHONES OF COMMUNICATION DEVICES AT A COMMON LOCATION

(71) Applicant: LENOVO (SINGAPORE) PTE. LTD, New Tech Park (SG)

(72) Inventors: John W. Nicholson, Cary, NC (US); Daryl C. Cromer, Raleigh, NC (US); Howard Locker, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 206 days.

(21) Appl. No.: 17/876,613

(22) Filed: Jul. 29, 2022

(65) Prior Publication Data

US 2024/0036808 A1 Feb. 1, 2024

(51) Int. Cl.
*G06F 3/16* (2006.01)
*H04R 3/00* (2006.01)

(52) U.S. Cl.
CPC ............ *G06F 3/165* (2013.01); *H04R 3/005* (2013.01); *H04R 2430/01* (2013.01)

(58) Field of Classification Search
CPC ... H04R 3/005; H04R 2430/01; H04M 3/568; H04M 2203/50; H04M 2203/2094; G10K 2210/108; G06F 3/165

USPC ........................ 381/80; 379/202.01; 709/204
See application file for complete search history.

(56) References Cited

U.S. PATENT DOCUMENTS

| | | | |
|---|---|---|---|
| 2006/0230106 A1* | 10/2006 | McDonald | H04L 65/4038 709/204 |
| 2014/0254820 A1* | 9/2014 | Gardenfors | H04M 3/42221 381/80 |
| 2015/0139043 A1* | 5/2015 | Grevers, Jr. | H04L 12/1827 370/260 |
| 2018/0132038 A1* | 5/2018 | Dickins | H04R 3/02 |
| 2020/0110572 A1* | 4/2020 | Lenke | G06F 3/167 |
| 2020/0329323 A1* | 10/2020 | Clark | H04N 7/147 |
| 2023/0077283 A1* | 3/2023 | Mehta | G10L 17/18 |

* cited by examiner

*Primary Examiner* — Norman Yu
(74) *Attorney, Agent, or Firm* — Dean D. Small; The Small Patent Law Group, LLC

(57) ABSTRACT

A system and method include a control unit in communication with a plurality of communication devices at a common location. Each of the plurality of communication devices includes a microphone. The control unit is configured to receive one or more audio signals from the microphone of each of the plurality of communication devices. The control unit is further configured to selectively unmute the microphone of one of the plurality of communication devices and mute the microphone of at least one other of the plurality of communication devices based on the one or more audio signals.

20 Claims, 3 Drawing Sheets

SYSTEMS AND METHODS FOR CONTROLLING MICROPHONES OF COMMUNICATION DEVICES AT A COMMON LOCATION

BACKGROUND

Examples of the present disclosure generally relate to systems and methods for controlling microphones of communication devices that are at a common location.

A teleconference typically includes multiple individuals participating through respective communication devices, such as personal computers, laptop computers, smart phones, smart tablets, and/or the like. In certain situations, multiple individuals who are participating in a teleconference may be within the same room. A known teleconferencing system includes a device, within the room, including a screen (such as a television), one or more speakers, and one or more microphones.

However, it can be difficult for the local participants to share content to the screen. In general, a participant either plugs in with an HDMI cable, or joins the meeting from the communication device, which can lead to audio problems including an echo when multiple playback speakers are not muted, and a positive feedback loop when multiple microphones within the same room are not muted. Also, it can be difficult to arrange the meeting room microphones to ensure voices are picked up well from all parts of the room.

Many systems and conference phones support multiple microphones, but may or may not all be connected to the same system. In certain known systems, microphone signals are mixed together, but in doing, can lead to timing and synchronization complexities.

SUMMARY

A need exists for a system and a method for effectively and efficiently controlling communication devices within a common location during a teleconference. Further, a need exists for a system and a method for eliminating, minimizing, or otherwise reducing echo and feedback during a teleconference including multiple communication devices at a common location. Also, a need exists for a system and a method that ensure effective reception of voices within a common location during a teleconference.

With those needs in mind, certain examples of the present disclosure provide a system including a control unit in communication with a plurality of communication devices that are at a common location. Each of the plurality of communication devices includes a microphone. The control unit is configured to receive one or more signals from the plurality of communication devices. The control unit is further configured to unmute the microphone of one of the plurality of communication devices and mute the microphone of at least one other of the plurality of communication devices based on the one or more signals.

In at least one example, the one or more signals include one or more audio signals. The control unit is configured to receive the one or more signals from the microphone of each of the plurality of communication devices.

In at least one example, the control unit is configured to mute the microphone of all of the other of the plurality of communication devices to ensure that only the one of the plurality of communication devices is unmuted.

In at least one example, each of the plurality of communication devices is associated with one or more individuals.

Each of the plurality of communication devices can also include a speaker. In at least one example, the control unit is further configured to unmute the speaker of the one of the plurality of communication devices and mute the speaker of the at least one other of the plurality of communication devices based on the one or more signals.

The control unit can be remotely located from the common location.

The system can also include one or more imaging devices at the common location. The control unit can be further configured to receive one or more video signals from the imaging device(s) to determine that the plurality of communication devices are at the common location.

Each of the plurality of communication devices can also include a display. In at least one example, the control unit is further configured to provide a muting indication on the display.

Certain examples of the present disclosure provide a method including receiving, by a control unit communication with a plurality of communication devices at a common location, one or more signals from the plurality of communication devices, wherein each of the plurality of communication devices includes a microphone; unmuting, by the control unit, the microphone of one of the plurality of communication devices based on the one or more signals; and muting, by the control unit, the microphone of at least one other of the plurality of communication devices based on the one or more signals.

Certain examples of the present disclosure provide a non-transitory computer-readable storage medium comprising executable instructions that, in response to execution, cause one or more control units comprising a processor, to perform operations comprising: receiving one or more signals from a plurality of communication devices that are at a common location, wherein each of the plurality of communication devices includes a microphone; unmuting the microphone of one of the plurality of communication devices based on the one or more signals; and muting the microphone of at least one other of the plurality of communication devices based on the one or more signals.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure provide systems and methods that improve teleconferences in which multiple individuals are gathered together physically in a common location, such as a conference room. Instead of collaboratively mixing, which has difficult synchronization and timing issues, the systems and methods of the present disclosure collaboratively determine mute settings such that there may be only one unmuted communication device in the common location.

Figure 1:
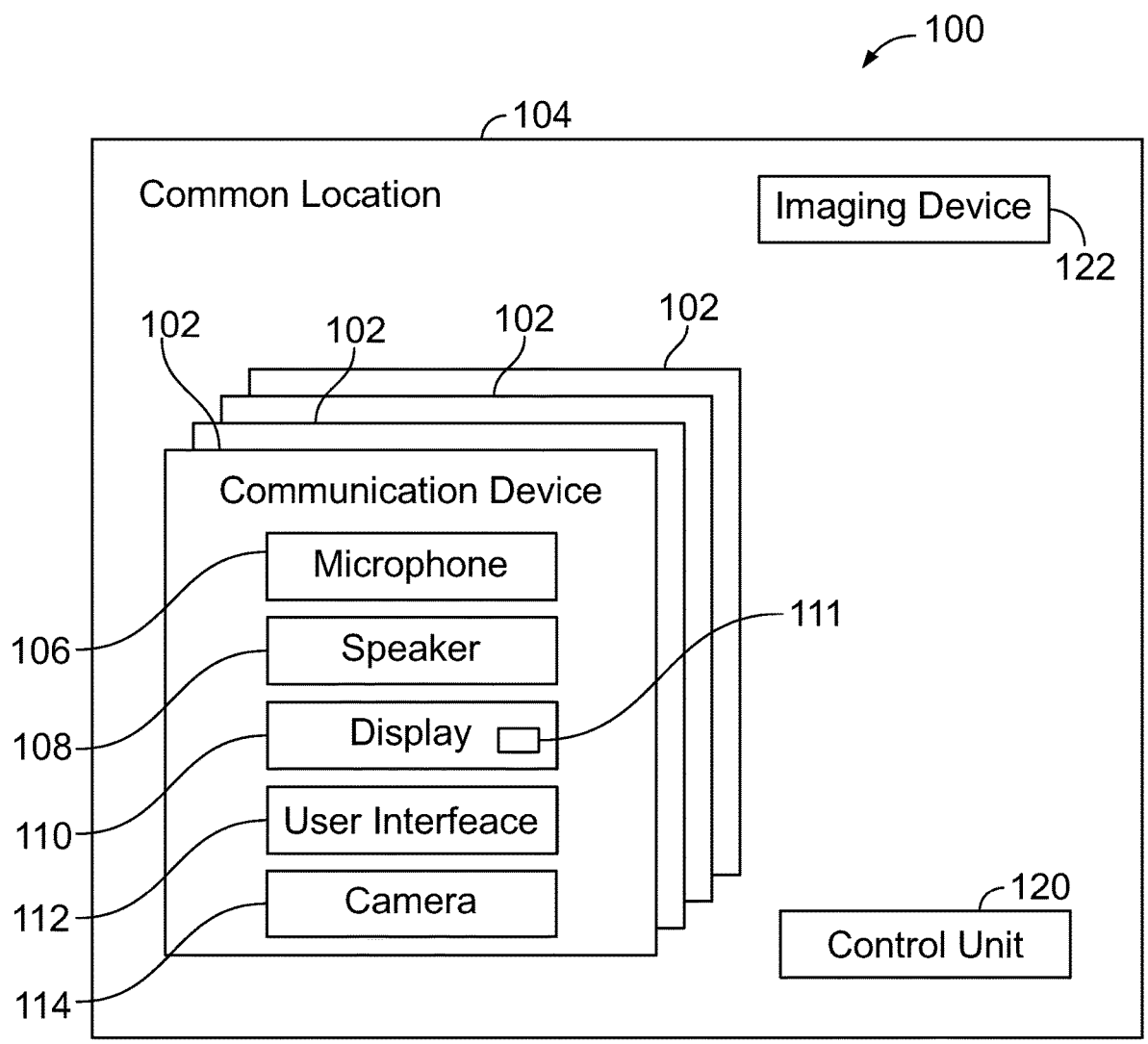
FIG. 1 illustrates a schematic block diagram of a system, according to an example of the present disclosure.

FIG. 1 illustrates a schematic block diagram of a system for system 100, according to an example of the present disclosure. The system 100 includes a plurality of communication devices 102 at a common location 104. The system 100 may also include an existing in-room communication system. In at least one example, the common location 104 is a room in which the communication devices 102 are located. The room can be an enclosed space within a residential or commercial building. As another example, the common location 104 can be a room or enclosed space within a vehicle, such as a commercial aircraft, bus, train car, or the like. As another example, the common location 104 can be an outdoor space in which the communication devices 102 are within a communication radius of one another. The communication radius can be a distance over which the communication devices 102 are able to pick up utterances or output audio signals. Locations that are not common include those separated by distances over 100 yards, within different buildings, and/or the like. A room within one floor of another building, and a room within a different floor of a building is another example of locations that are not common. Examples of the communication devices 102 include personal computers, laptop computers, handheld electronic devices such as cellular or smart phones, smart tablets, and/or the like. In at least one example, teleconferences can include a first set of communication devices at a first common location, and a second set of communication devices at a second common location.

Each of the communication devices 102 is associated with one or more respective individuals. For example, an individual has a communication device 102 through which he or she communicates. As another example, multiple individuals can use a single communication device 102. The communication devices 102 includes a microphone 106, a speaker 108, a display 110, a user interface 112, and a camera 114. Examples of the display 110 include an electronic monitor, electronic screen, television, or the like. Examples of the user interface 112 includes a keyboard, a mouse, a stylus, and/or the like. In at least one example, the display 110 and the user interface 112 can be integrated, such as into a touchscreen interface. In at least one example, one or more of the communication devices 102 may not include the display 110, the user interface 112, and/or the camera 114. The common location 104 can include more or fewer communication devices 102 than shown. For example, the common location 104 can include, two, three, four, five, or more communication devices 102, each of which can be associated with one or more individuals. As another example, the common location 104 can include two or three communication devices 102.

A control unit 120 is in communication with the communication devices 102. The control unit 120 can be within the common location 104. In at least one example, the control unit 120 can be within one of the communication devices 102. As another example, the control unit 120 is remotely located from the common location 104. The control unit 120 can be in communication with the communication devices 102 through one or more wired or wireless connections. For example, the control unit 120 can be in communication with the communication devices 102 through one or more communication applications, the Internet, cellular communication, and/or the like. In at least one example, the control unit 120 is part of a teleconferencing system, application, and/or the like.

The common location 104 can also include an imaging device 122, such as a video camera. The imaging device 122 can be configured to detect the communication devices 102 within the common location 104. The imaging device 122 can also be in communication with the control unit 120, such as through one or more wired or wireless connections. The control unit 120 is configured to receive video signals from the imaging device 122 to determine the presence of the communication devices 102, and the individuals associated therewith, within the common location 104. As another example, the communication devices 102 within the common location 104 can be detected through location reporting, Bluetooth, UWB, acoustic and/or ultrasonic messaging, and/or the like.

In operation, individuals associated with the communication devices 102 at the common location 104 participate in a teleconference in which they communicate via the microphones 106 and the speakers 108 (and optionally through the displays 110 and user interfaces 112). Individuals having other communication devices outside of the common location can also participate in the teleconference.

In order to eliminate, minimize, or otherwise reduce echo and/or feedback, and also improve audio quality of the teleconference, the control unit 120 mutes one or more of the communication devices 102 and unmutes one or more of the communication devices 102. For example, if an individual associated with a communication device 102 within the common location 104 is speaking, the control unit 120 receives the audio signal from the microphone of that particular communication device 102 and unmutes that particular communication device 102, while muting the microphones of the remaining communication devices 102 within the common location 104. The control unit 120 can maintain the muted/unmuted relationship of the microphones 106 among the communication devices 102 until the control unit 120 receives an audio signal from a microphone 106 of another microphone 106 of another communication device 102 within the common location, at which point the control unit 120 unmutes that microphone 106 and mutes the other microphones 106.

In at least one example, the common location 104 can include a speaker as part of its infrastructure. The control unit 120 can selectively unmute and unmute that speaker in relation to the speakers/microphones of the communication devices 102.

When the microphones 106 are muted, the microphones 106 remain active in that the muted microphones 106 still pick up audio, and output audio signals associated therewith to the control unit 120. The control unit 120 selectively mutes and unmutes the microphones 106 within the common location 104 based on attributes of the audio signals received from the microphones 106. For example, the control unit 120 can unmute the microphone 106 from which the control unit 120 receives the strongest audio signal, and mute the remaining microphones 106. The muting and unmuting can continually change based on the strength of the audio signals received from the microphones 106 within the common location 104. In at least one example, the control unit 120 can send and/or mix audio into a teleconference application, instead of simply controlling muting. In at least one example, the control unit 120 may or may not adjust a mute indicator in a particular application, but may provide a hidden or secondary control.

The control unit 120 can determine that the communication devices 102 are within the common location 104 through the video signals received from the imaging device 122. Optionally, the system 100 may not include the imaging device 122. The control unit 120 automatically selectively mutes and unmutes the microphones 106 of the communication devices 102 within the common location 104, but may not selectively mute and unmute microphones of communication devices outside of the common location 104. As another example, the control unit 120 can independently and automatically selectively mute and unmute microphones of communication devices within one common location and those within another common location, each of which can be participating in the same teleconference.

As described herein, the system 100 includes the control unit 120 in communication with (such as via internet communications, cellular data, one or more applications, and/or the like) the plurality of communication devices 102 at the common location 104. Each of the plurality of communication devices 102 includes a microphone 106. The control unit 120 is configured to receive one or more signals (for example, audio signals, video signals, and/or the like) from each of the plurality of communication devices 102. The control unit 120 is further configured to unmute a microphone 106 of one of the plurality of communication devices 102 and mute the microphone 106 of at least one other of the plurality of communication devices 102 based on the one or more signals. In at least one example, the control unit is configured to selectively mute the microphone 106 of all of the of the plurality of communication devices 102 to ensure that only the microphone of the one of the plurality of communication devices is unmuted.

Figure 2:
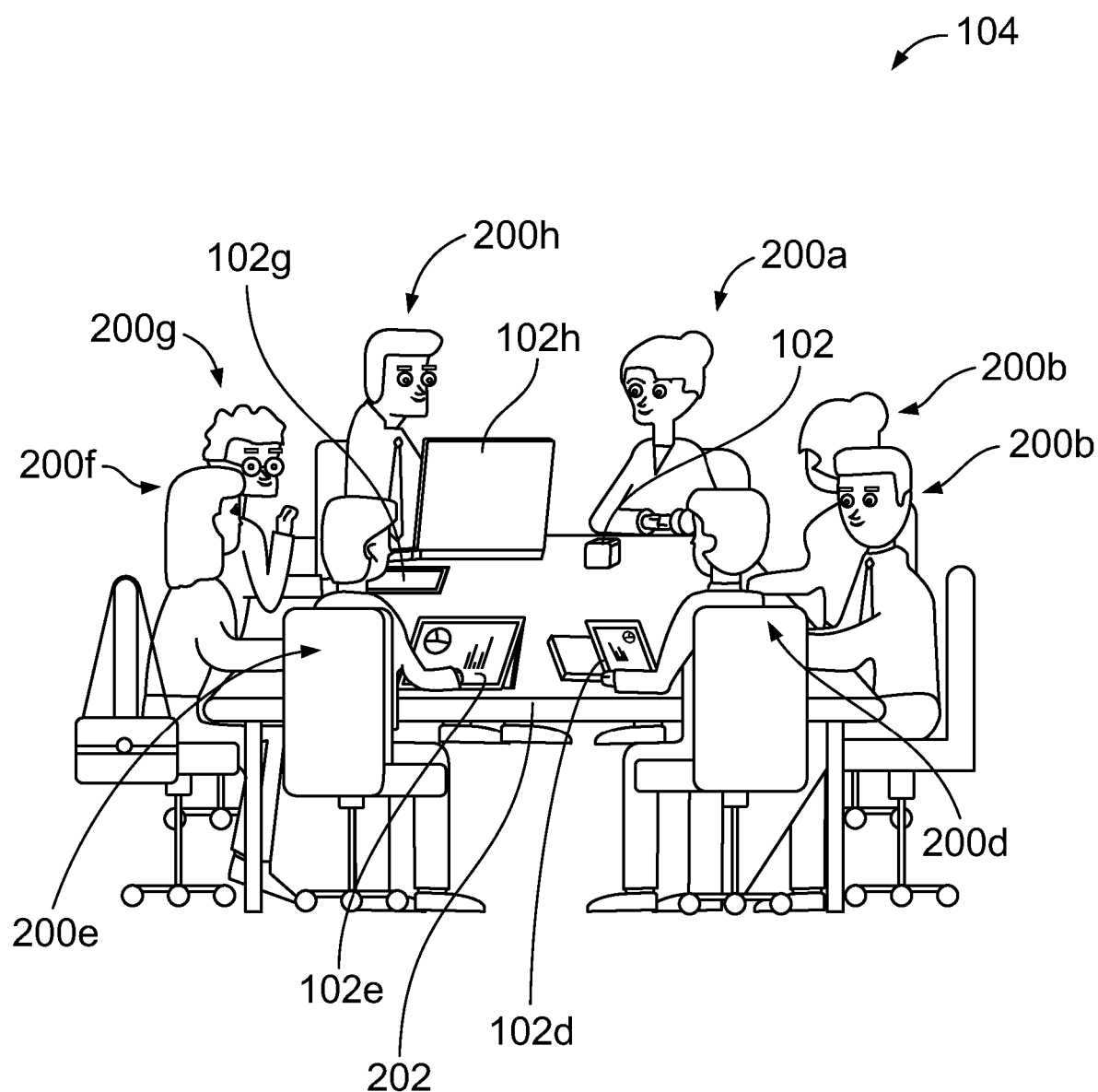
FIG. 2 illustrates a perspective view of a plurality of individuals within a common location participating in a teleconference, according to an example of the present disclosure.

FIG. 2 illustrates a perspective view of a plurality of individuals 200a-h within the common location 104 participating in a teleconference, according to an example of the present disclosure. Each of the individuals 200a-h is associated with a respective communication device 102a-h. As shown, the common location 104 can include a table 202 around which the individuals 200a-h are seated. As another example, the common location 104 may not include a table. Instead the common location can include any number of individuals within a defined audio radius of one another (such as within 50 feet). The common location 104 can include more or fewer individuals than shown.

Referring to FIGS. 1 and 2, the individuals 200a-h associated with the communication devices 102a-h join a teleconference (such as a web-based audio and/or video teleconference). The control unit 120 receives signals from the communication devices 102a-h and/or the imaging device 122 to determine which communication devices 102a-h are within the common location 104 (that is, physically co-located). For example, the control unit 120 determines that the communication devices 102a-h are at the common location 104 through one or more of video signals output from the imaging device 122, Bluetooth signaling from the communication devices 102a-h, shared geo coordinates among the communication devices 102a-h, shared Wi-Fi SSIDs among the communication devices 102a-h, ultrasonic communication among the communication devices 102a-h, and/or the like.

In at least one example, the microphones 106 (such as may include the unified communication applications running on the communication devices 102) are muted at the application level. The control unit 120 monitors the audio signals received from the microphones 106 (which are active, whether muted or unmuted) to determine audio levels of the microphones 106. In response to detection of a change in an audio level, the control unit 120 can trigger an assessment among the microphones 106 of the communication devices 102a-h at the common location 104 determine whether muting control (that is, selective muting and unmuting) is to switch among the communication devices 102a-h.

The control unit 120 is configured to selectively unmute one communication device 102a-h and mute the other communication devices 102a-h by assessing the signals (for example, audio signals and/or video signals) received therefrom. For example, the control unit 120 can unmute the communication device 102 that outputs an audio signal having the greatest signal strength (such as can be determined through root of the mean of the square), greatest signal-to-nose strength, highest gain, the loudest level, the greatest change in level, greatest voice energy (such as through spectrogram analysis), a change in a mute setting of the communication device 102a-h by an individual 200a-h, image processing of video signals received from the camera 114 to determine if an individual is talking (such as through mouth movements determined from the video signals, other features and/or specifications (such as signal processing features, for example audio processing objects), sensitivity of the microphones, physical positions of the individuals 200a-h within the room (central location, corner location, proximity to other individuals, and/or the like), as detected by the imaging device 122, and/or the like.

In at least one example, the control unit 120 ensures that only one microphone 106 of one communication device 102a-h is unmuted at any time, which is changed based on which of the individuals 200a-h within the common location 104 is currently talking. In at least one example, the control unit 120 is configured to selectively and automatically mute and unmute microphones 106 and speakers 108 of the communication devices 102a-h at the common location 104, thereby eliminating, minimizing, or otherwise reducing any risk of feedback.

Notably, the actual switching of the microphones 106 can switch extremely fast, and be coordinated at computer-speed, such that in practice switching can occur as soon as each person starts to speak. As such, a human being would be incapable of controlling and switching the microphones 106 in such fashion.

In at least one example, the communication devices 102a-h can show a mute button 111, such as on the display 110. The individuals 200a-h can manually mute their microphones 106 by engaging the mute button 111. In at least one example, when the control unit 120 automatically mutes a microphone 106 of a communication device 102, the control unit 120 may output an indicator signal to the communication device 102. The indicator signal includes data that provides an automatic indication on the display 110, such as on the mute button 111, which indicates that the microphone is automatically muted. For example, the automatic indication can be an outline around the mute button 111, a highlighting of the mute button 111, a change of color of the mute button 111, and/or the like.

The control unit 120 can be configured to provide a muting indication on the display 110 of each of the communication devices 102 during a teleconference, for example. The muting indication can include text and/or graphic (such as highlighting, color code, and/or the like) indicating that the particular communication device 102 is either automatically muted or automatically unmuted.

In at least one example, because the client application can retain a user-controlled mute setting, when the control unit 120 receives a signal from a communication device 102 indicating that the mute button 111 has been engaged to unmute the communication device 102 (thereby indicating an intent to speak), the control unit 120 can proactively unmute that communication device 102, and mute the other communication devices 102.

In at least one example, the control unit 120 can also automatically control volume and muting of the speakers 108 of the communication devices 102 as well, such that output of the speakers 108 switches to the communication device 102 having a microphone 106 that is unmuted (as controlled by the control unit 120). In doing so, the control unit 120 enables acoustic echo cancellation (AEC) circuitry of the communication devices 102 to prevent or otherwise reduce local echo and/or feedback. In at least one example, when an individual 200a-h is talking such that the microphone 106 of their respective communication device 102a-h is unmuted, the control unit 120 can further operate the speakers 108 of the other communication devices 102 to be active (for example, unmuted and outputting audio signals) if someone else is also talking. While in this mode, there can be a default communication device designated for when none of the co-located communication devices are indicating an intent to talk. For example, such a default can have a better or more centrally located speaker system, such as located within the common location 104.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, the control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform the operations of the methods also described herein. For example, the control unit 120 can be an artificial intelligence or machine learning system. These types of systems may be trained from outside information and/or self-trained to repeatedly, automatically, and selectively switch muting control of the microphones 106 of the communication devices 102 within the common location 104. The control unit 120 can determine the muting control via artificial intelligence and/or machine learning. Over time, these systems can improve by matching records with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing who is speaking based on received audio signals), customization (for example, generating or modifying rules to optimize record matching), or the like. The systems may be trained and re-trained using feedback from one or more prior analyses of samples and/or data. Based on this feedback, the systems may be trained by adjusting one or more parameters, weights, rules, criteria, or the like, used in the analysis of the same or other samples. This process can be performed using generated data instead of training data, and may be repeated many times to repeatedly improve the correlation of commands. The training of the record matching system minimizes false positives and/or false negatives by performing an iterative training algorithm, in which the systems are retrained with an updated set of data and based on the feedback examined prior to the most recent training of the systems. This provides a robust muting control model that can better determine which microphones 106 are to be muted and unmuted.

Figure 3:
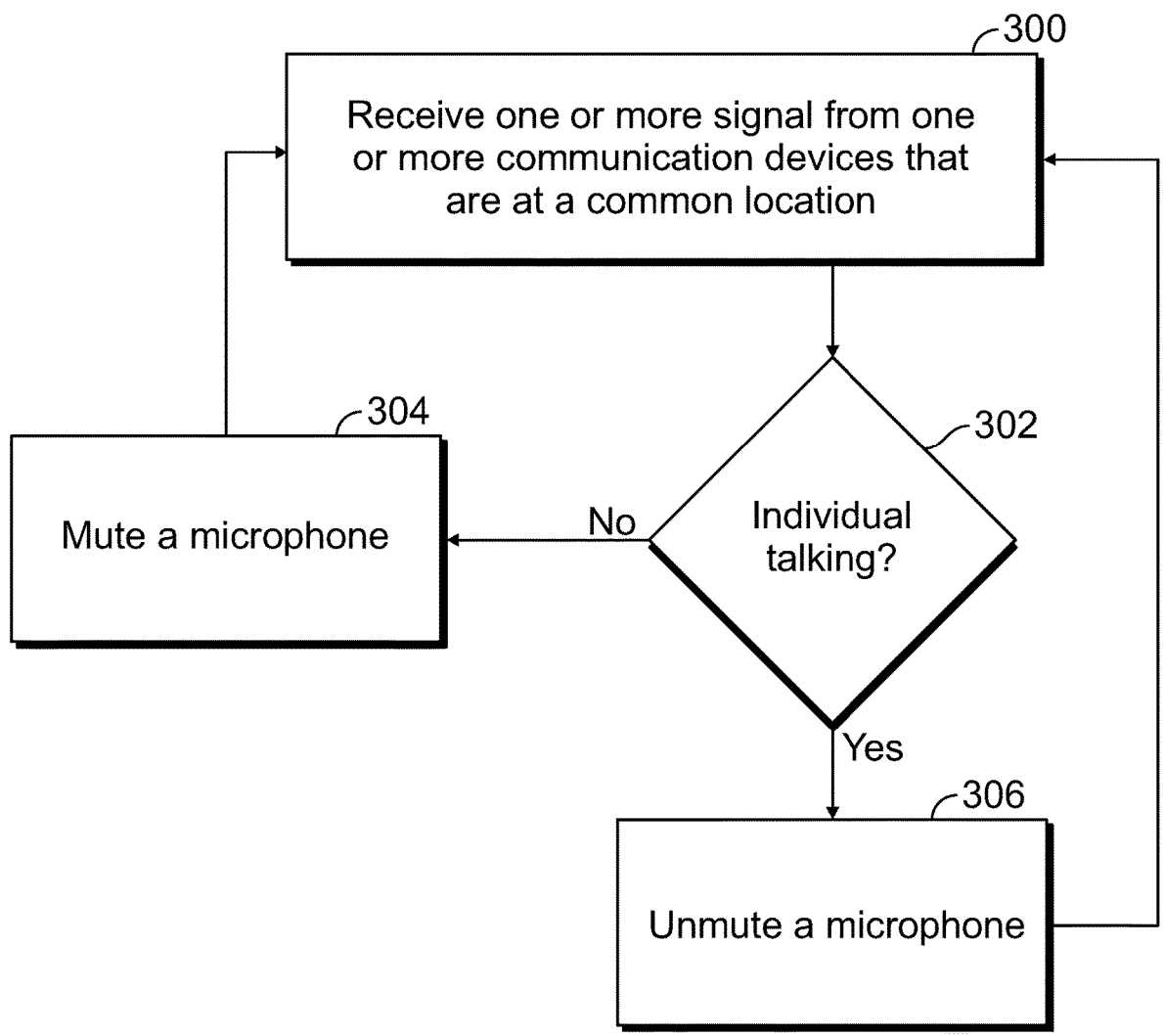
FIG. 3 illustrates a flow chart of a method, according to an example of the present disclosure.

FIG. 3 illustrates a flow chart of a method, according to an example of the present disclosure. Referring to FIGS. 1-3, at 300, the control unit 120 receives one or more signals (such as audio signals and/or video signals) from one or more communication devices 102 that are at the common location 104. At 302, the control unit 120 determines if the signals indicate that an individual associated with a communication device 102 is talking. In at least one example, the control unit 120 determines which individual is talking. For example, the control unit 120 can determine that an individual is talking in response to receiving an audio signal having the greatest signal strength, greatest signal-to-nose strength, highest gain, the loudest level, the greatest change in level, and/or greatest voice energy, not just total energy (such as can be determined through root of the mean of the square). As other examples, the control unit 120 can determine that an individual is talking in response to a change in a mute setting of a communication device 102, image processing of video signals received from the camera 114 to determine if an individual is talking (such as through mouth movements determined from the video signals, other features and/or specifications (such as signal processing features, for example audio processing objects), sensitivity of the microphones, physical positions of the individuals within the room (central location, corner location, proximity to other individuals, and/or the like), as detected by the imaging device 122, and/or the like.

If at 302, the control unit 120 determines that an individual of a communication device 102 is not talking, the method proceeds to 304, at which the control unit 120 mutes the microphone 106 of that communication device 102. The method then returns to 300.

If, however, the control unit 120 at 302 determines that the individual of a communication is talking, the method proceeds to 306, at which the control unit 120 unmutes the microphone of that communication device 102. The method then returns to 300.

Further, the disclosure comprises embodiments according to the following clauses:

Clause 1: A system comprising:
 a control unit in communication with a plurality of communication devices that are at a common location, wherein each of the plurality of communication devices includes a microphone,
 wherein the control unit is configured to receive one or more signals from the plurality of communication devices, and
 wherein the control unit is further configured to unmute the microphone of one of the plurality of communication devices and mute the microphone of at least one other of the plurality of communication devices based on the one or more signals.

Clause 2. The system of Clause 1, wherein the one or more signals include one or more audio signals, and wherein the control unit is configured to receive the one or more signals from the microphone of each of the plurality of communication devices.

Clause 3. The system of Clauses 1 or 2, wherein the control unit is configured to mute the microphone of all of the other of the plurality of communication devices to ensure that only the one of the plurality of communication devices is unmuted.

Clause 4. The system of any of Clauses 1-3, wherein each of the plurality of communication devices is associated with one or more individuals.

Clause 5. The system of any of Clauses 1-4, wherein each of the plurality of communication devices further comprises a speaker.

Clause 6. The system of Clause 5, wherein the control unit is further configured to unmute the speaker of the one of the plurality of communication devices and mute the speaker of the at least one other of the plurality of communication devices based on the one or more signals.

Clause 7. The system of any of Clauses 1-6, wherein the control unit is remotely located from the common location.

Clause 8. The system of any of Clauses 1-7, further comprising at least one other device at the common location, wherein the control unit is further configured to receive one or more signals from the at least one other device to determine that the plurality of communication devices are at the common location.

Clause 9. The system of any of Clauses 1-8, wherein each of the plurality of communication devices comprises a display, and wherein the control unit is further configured to provide a muting indication on the display.

Clause 10. A method comprising:
 receiving, by a control unit communication with a plurality of communication devices at a common location, one or more signals from the plurality of communication devices, wherein each of the plurality of communication devices includes a microphone;
 unmuting, by the control unit, the microphone of one of the plurality of communication devices based on the one or more signals; and
 muting, by the control unit, the microphone of at least one other of the plurality of communication devices based on the one or more signals.

Clause 11. The method of Clause 10, wherein the one or more signals include one or more audio signals, and wherein said receiving comprises receiving the one or more signals from the microphone of each of the plurality of communication devices.

Clause 12. The method of Clauses 10 or 11, wherein said muting comprises muting the microphone of all of the other of the plurality of communication devices to ensure that only the one of the plurality of communication devices is unmuted.

Clause 13. The method of any of Clauses 10-12, wherein each of the plurality of communication devices is associated with one or more individuals.

Clause 14. The method of any of Clauses 10-13, wherein each of the plurality of communication devices further comprises a speaker, and wherein the method further comprises:
 unmuting, by the control unit, the speaker of the one of the plurality of communication devices; and muting, by the control unit, the speaker of the at least one other of the plurality of communication devices based on the one or more signals.

Clause 15. The method of any of Clauses 10-14, wherein the control unit is remotely located from the common location.

Clause 16. The method of any of Clauses 10-15, further comprising:
receiving, by the control unit, one or more video signals from an imaging device at the common location; and
determining, by the control unit from the one or more video signals, that the plurality of communication devices are at the common location.

Clause 17. The method of any of Clauses 10-16, further comprising providing, by the control unit, a muting indication on a display of each of the plurality of communication devices comprises a display.

Clause 18. A non-transitory computer-readable storage medium comprising executable instructions that, in response to execution, cause one or more control units comprising a processor, to perform operations comprising:
receiving one or more signals from a plurality of communication devices that are at a common location, wherein each of the plurality of communication devices includes a microphone;
unmuting the microphone of one of the plurality of communication devices based on the one or more signals; and
muting the microphone of at least one other of the plurality of communication devices based on the one or more signals.

Clause 19. The non-transitory computer-readable storage medium of Clause 18, wherein the one or more signals include one or more audio signals, and wherein said receiving comprises receiving the one or more signals from the microphone of each of the plurality of communication devices.

Clause 20. The non-transitory computer-readable storage medium of Clauses 18 or 19, wherein said muting comprises muting the microphone of all of the other of the plurality of communication devices to ensure that only the one of the plurality of communication devices is unmuted.

As described herein, examples of the present disclosure provide systems and methods for effectively and efficiently controlling communication devices within a common location during a teleconference. Further, examples of the present disclosure provide systems and methods for eliminating, minimizing, or otherwise reducing echo and feedback during a teleconference including multiple communication devices at a common location. Also, examples of the present disclosure provide systems and methods that ensure effective reception of voices within a common location during a teleconference.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a control unit in communication with a plurality of communication devices that are at a common location, wherein each of the plurality of communication devices includes a microphone,
wherein the control unit is configured to receive one or more audio signals from the microphone of each of the plurality of communication devices, and
wherein the control unit is further configured to unmute the microphone of one of the plurality of communication devices based on a first strength of the one or more audio signals, and mute the microphone of at least one other of the plurality of communication devices based on a second strength of the one or more audio signals, wherein the first strength is greater than the second strength.

2. The system of claim 1, wherein the control unit is configured to mute the microphone of all of the other of the plurality of communication devices to ensure that only the one of the plurality of communication devices is unmuted.

3. The system of claim 1, wherein each of the plurality of communication devices is associated with one or more individuals, and wherein the control unit is configured to unmute the microphone of the one of the plurality of communication devices and mute the microphone of the at least one other of the plurality of communication devices according to which of the one or more individuals is speaking determined, at least in part, from the first strength and the second strength of the one or more audio signals.

4. The system of claim 1, wherein each of the plurality of communication devices further comprises a speaker.

5. The system of claim 4, wherein the control unit is further configured to unmute the speaker of the one of the plurality of communication devices and mute the speaker of the at least one other of the plurality of communication devices based on the one or more audio signals.

6. The system of claim 1, wherein the control unit is remotely located from the common location.

7. The system of claim 1, further comprising at least one other device at the common location, wherein the control unit is further configured to receive one or more audio signals from the at least one other device to determine that the plurality of communication devices are at the common location.

8. The system of claim 1, wherein each of the plurality of communication devices comprises a display, and wherein the control unit is further configured to provide a muting indication on the display.

9. A method comprising:
receiving, by a control unit communication with a plurality of communication devices at a common location, one or more audio signals from a microphone of each of the plurality of communication devices;
unmuting, by the control unit, the microphone of one of the plurality of communication devices based on a first strength of the one or more audio signals; and
muting, by the control unit, the microphone of at least one other of the plurality of communication devices based on a second strength of the one or more signals, wherein the first strength is greater than the second strength.

10. The method of claim 9, wherein said muting comprises muting the microphone of all of the other of the plurality of communication devices to ensure that only the one of the plurality of communication devices is unmuted.

11. The method of claim 9, wherein each of the plurality of communication devices is associated with one or more individuals, and said unmuting and said muting are determined according to which of the one or more individuals is speaking.

12. The method of claim 9, wherein each of the plurality of communication devices further comprises a speaker, and wherein the method further comprises:
unmuting, by the control unit, the speaker of the one of the plurality of communication devices; and
muting, by the control unit, the speaker of the at least one other of the plurality of communication devices based on the one or more audio signals.

13. The method of claim 9, wherein the control unit is remotely located from the common location.

14. The method of claim 9, further comprising:
receiving, by the control unit, one or more video signals from an imaging device at the common location; and
determining, by the control unit from the one or more video signals, that the plurality of communication devices are at the common location.

15. The method of claim 9, further comprising providing, by the control unit, a muting indication on a display of each of the plurality of communication devices comprises a display.

16. A non-transitory computer-readable storage medium comprising executable instructions that, in response to execution, cause one or more control units comprising a processor, to perform operations comprising:
receiving one or more audio signals from a microphone of each of a plurality of communication devices that are at a common location;
unmuting the microphone of one of the plurality of communication devices based on a first strength of the one or more signals; and
muting the microphone of at least one other of the plurality of communication devices based on a second strength of the one or more signals, wherein the first strength is greater than the second strength.

17. The non-transitory computer-readable storage medium of claim 16, wherein said muting comprises muting the microphone of all of the other of the plurality of communication devices to ensure that only the one of the plurality of communication devices is unmuted.

18. The system of claim 3, further comprising an imaging device in communication with the control unit, wherein the control unit is further configured to receive one or more video signals from the imaging device, and wherein the control unit is configured to determine which of the one or more individuals is speaking determined from the one or more audio signals and from the video signals.

19. The method of claim 11, further comprising receiving, by the control unit, one or more video signals from an imaging device, and wherein said unmuting and said muting are determined according to which of the one or more individuals is speaking based on the one or more audio signals and the one or more video signals.

20. The non-transitory computer-readable storage medium of claim 16, further comprising receiving one or more video signals from an imaging device, and wherein said unmuting and said muting are determined according to which of one or more individuals is speaking based on the one or more audio signals and the one or more video signals.

* * * * *